US008001045B1

(12) United States Patent
McClinton (10) Patent No.: US 8,001,045 B1
(45) Date of Patent: Aug. 16, 2011

(54) ACCOUNT SYNCHRONIZATION (75) Inventor: Brian J. McClinton, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 261 days.

(21) Appl. No.: 12/262,515

(22) Filed: Oct. 31, 2008

Related U.S. Application Data (60) Provisional application No. 61/079,570, filed on Jul. 10, 2008.

(51) Int. Cl.
*G06Q 40/00* (2006.01)
(52) U.S. Cl. .......................... 705/40; 705/42
(58) Field of Classification Search ................ 705/35, 705/40–44
See application file for complete search history.

(56) References Cited

U.S. PATENT DOCUMENTS

| | | | |
|---|---|---|---|
| 6,704,714 B1 | 3/2004 | O'Leary et al. | |
| 7,155,411 B1 | 12/2006 | Blinn et al. | |
| 7,401,731 B1 | 7/2008 | Pletz et al. | |
| 2004/0172279 A1 | 9/2004 | Carolan et al. | |
| 2005/0234820 A1 | 10/2005 | MacKouse | |
| 2006/0112009 A1 | 5/2006 | Ehrhart et al. | |
| 2006/0116949 A1* | 6/2006 | Wehunt et al. | ............ 705/35 |
| 2007/0005498 A1 | 1/2007 | Cataline et al. | |
| 2008/0015982 A1* | 1/2008 | Sokolic et al. | ............ 705/39 |
| 2008/0301037 A1 | 12/2008 | Monk | |

OTHER PUBLICATIONS

U.S. Office Action issued on Dec. 7, 2010 in related U.S. Appl. No. 12/262,509.

* cited by examiner

*Primary Examiner* — James A Kramer
*Assistant Examiner* — Hao Fu
(74) *Attorney, Agent, or Firm* — Banner & Witcoff, Ltd (57) ABSTRACT

Aspects of this disclosure relate to a method of electronically receiving data from a first external source regarding the creation a first financial account or an update to the first financial account and storing the data from the first external source in a database. Further, the method includes determining whether the data from the first external source represents the creation of the first financial account or an update to the first financial account and if the data from the first external source represents the creation of the first financial account, then electronically transferring to a second external source the data from the first external source. Additionally, the method includes retrieving the stored data from the database and causing an indication to be displayed on a computer display through which a user can select the first financial account as an account from which a payment will be made directly to a payee and retrieving the stored data from the database and causing an indication to be displayed on the computer display through which a user can select the first financial account as an account from which funds will be transferred to or from a second financial account.

15 Claims, 6 Drawing Sheets

ACCOUNT SYNCHRONIZATION

CROSS-REFERENCE TO RELATED APPLICATIONS

This application claims priority to Provisional Application 61/079,570 filed Jul. 10, 2008, the contents of which are incorporated by reference herein in their entirety.

BACKGROUND

Many banks today offer electronic payment services. These services allow a bank's customer to schedule and make payments to third parties from the customer's checking account at the bank. In some cases, a bank will allow a customer to schedule and make a payment from a checking account managed by a different bank. However, these services are typically limited to payments to liabilities of that service owner. Where the user wants to make payments from various different account types to various different payees, the customer needs to work individually with the various managers of those accounts, and/or with the various payees. This can be time-consuming and inconvenient to the customer.

In addition, customers are often faced with the need or desire to close a bank account. For example, a customer may want to close an account in one bank and open a replacement account in a different bank. But because many customers attach automatic and other payments to their accounts, the burden of having to re-enter all of this payment and payee information is too much. This may result in the customer not changing the account after all and remaining in an undesirable situation. However, sometimes customers will not do so because they might need to manually re-enter all payment information

SUMMARY

Aspects of this disclosure relate to a method of electronically receiving data from a first external source regarding the creation a first financial account or an update to the first financial account and storing the data from the first external source in a database. Further, the method includes determining whether the data from the first external source represents the creation of the first financial account or an update to the first financial account and if the data from the first external source represents the creation of the first financial account, then electronically transferring to a second external source the data from the first external source. Additionally, the method includes retrieving the stored data from the database and causing an indication to be displayed on a computer display through which a user can select the first financial account as an account from which a payment will be made directly to a payee and retrieving the stored data from the database and causing an indication to be displayed on the computer display through which a user can select the first financial account as an account from which funds will be transferred to or from a second financial account.

Further, aspects of this disclosure relate to a computer-readable medium storing computer executable instructions for performing a method of electronically receiving data from a first external source regarding the creation a first financial account or an update to the first financial account and storing the data from the first external source in a database. Further, the method includes determining whether the data from the first external source represents the creation of the first financial account or an update to the first financial account and if the data from the first external source represents the creation of the first financial account, then electronically transferring to a second external source the data from the first external source. Additionally, the method includes retrieving the stored data from the database and causing an indication to be displayed on a computer display through which a user can select the first financial account as an account from which a payment will be made directly to a payee and retrieving the stored data from the database and causing an indication to be displayed on the computer display through which a user can select the first financial account as an account from which funds will be transferred to or from a second financial account.

Additional aspects of this disclosure relate to a system coupled to a first source and a second source via a network wherein the system includes a service provider computing device which includes at least one database. Additionally the system electronically receives data over the network from the first source regarding the creation of a first financial account or an update to the first financial account and further the service provider computing device stores the data from the first source in the database. Also, the service provider computing device determines whether the data from the first source represents the creation of the first financial account or an update to the first financial account and if the data from the first external source represents the creation of the first financial account, the service provider computing device electronically transfers over the network to a second source the data from the first source. Further, the service provider computing device retrieves the stored data from the database and causes an indication to be displayed on a computer display through which a user can select the first financial account as an account from which a payment will be made directly to a payee and also the service provider computing device retrieves the stored data from the database and causes an indication to be displayed on the computer display through which a user can select the first financial account as an account from which funds will be transferred to or from a second financial account.

By providing such a multi-account payment platform, a bank or other service provider may position itself as a convenient payment portal—a one-stop shop for making payments from any account, to any payee. The convenience of such services may entice customers to consolidate lines of credit and other types of financial accounts with the same bank and/or to explore what other services may be provided. This may provide a significant advantage over competitors who do not offer such services.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
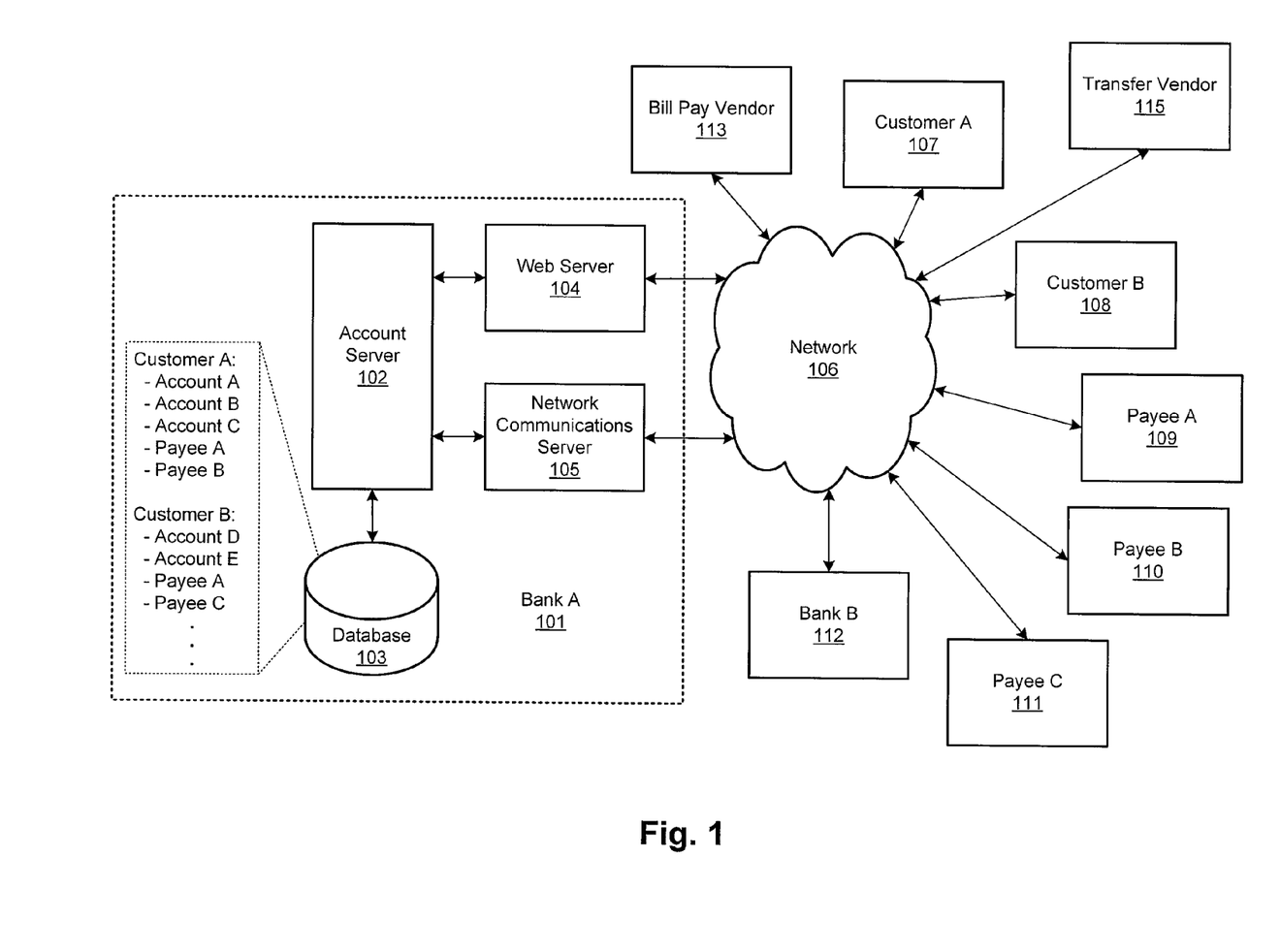
FIG. 1 is a functional block diagram of an illustrative embodiment of a system and its environment for providing multi-account payment services to one or more payees.

FIG. 1 is a functional block diagram of an illustrative embodiment of a system and its environment for providing multi-account payment services to one or more payees. In this example, a first bank 101 (referred to herein as Bank A) has or otherwise controls an account server 102, a database 103, a web server 104, and a network communications server 105, all coupled together as shown so that data and/or other signals may be communicated between them. Network communications server 105 is communicatively coupled to a network 106 that may include one or more networks such as the Internet. Network 106, in turn, is communicatively coupled to first and second customers 107, 108 (referred to herein as Customers A and B, respectively), another bank 112 (referred to herein as Bank B), first, second, and third payees 109, 110, 111 (referred to herein as Payee A, Payee B, and Payee C, respectively), and a bill pay vendor 113. These functional blocks are merely illustrative. For example, additional customers, payees, and banks may be coupled to network 106, and any of the functional blocks 102-105 may be physically divided as shown or combined in any manner desired.

The various servers 102, 104, 105, the various customer terminals 107, 108, Bank B 110, and Payees A, B, and C 109, 110, 111, may each be embodied as, or otherwise include, any one or more types of computing devices. A "computing device," as referred to herein, includes any electronic, electro-optical, and/or mechanical device or system of devices that is able to process and manipulate information, such as in the form of data. Non-limiting examples of a computing devices includes a personal computer, a personal digital assistant (PDA), a smart phone, a server, and/or a system of these in any combination. In addition, a given computing device may be physically all in one location or may be distributed amongst a plurality of locations (i.e., may implement distributive computing). Moreover, any of servers 102, 104, and 105 may be separate computing devices or combined into one or more computing devices.

Database 103 may include any one or more data storage media, such as but not limited to one or more memory chips, one or more magnetic storage disks (e.g., hard drives), one or more optical storage disks (e.g., compact disks, or CDs, along with their respective drives), and/or one or more magnetic tape drives. These data storage media are also referred to as computer-readable media. The term "computer-readable medium" as used herein includes not only a single medium or type of medium, but also to a combination of one or more media and/or types of media. Such a computer-readable medium may store computer-readable instructions (e.g., software) and/or computer-readable data. These instructions and data may be used by account server 102 (and/or servers 104 and/or 105) to perform or assist it to perform any of the functions attributed to servers 102, 104, and/or 105. Furthermore, database 103 may include a relational database, such as a structured query language (SQL) database.

The data stored by database 103 may include account information for a plurality of account holders such as Customer A 107 and Customer B 108. This account information may include, for example, account holder's name, social security number, address, and phone number; account identifier (e.g., account number); account type; and a list of payees including information used for transferring a payment to each payee. Furthermore, database 103 may associate, or relate, some portions of this data with other portions of this data. For example, for each account, database 103 may associate each account identifier with the remaining information for that account. Account server 102 may issue queries to database 103 to obtain the desired information from database 103. Account database may also store data representing information about one or more payees, such as Payee A 109, Payee B 110, and Payee C 111, associated with a particular customer and/or customer account. This payee information may be sufficient to allow a payment to actually be made to a payee, such as including an account number, electronic funds transfer destination, address, phone number, and/or name of each payee.

Web server 104 may produce an Internet web site, accessible by customer terminals 107 and 108, that allows customers/account holders to access their accounts and/or set up payments from one or more of their accounts to one or more payees. The web site produced by web server 104 will be referred to herein as an online banking web site. The accounts accessible through the online banking web site may be of different types and may be accounts managed by the bank, by a different bank, and/or by any other type of financial institution. The financial accounts from which payments may be made may include, for example, checking accounts, savings accounts, money market accounts and other investment accounts, internal and external demand deposit accounts (DDAs), credit card accounts, and other line of credit accounts such as home equity line of credit (HELOC) accounts. Of course, other types of financial accounts are possible.

Figure 2:
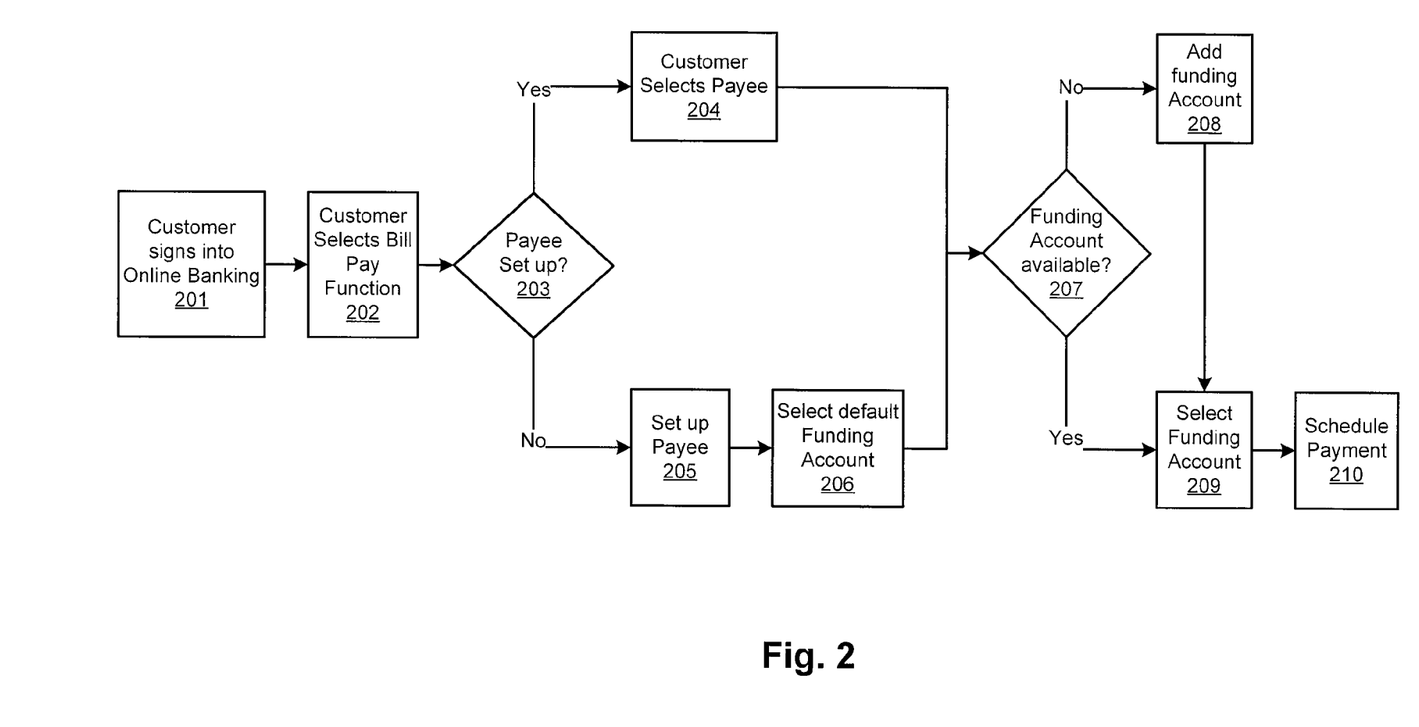
FIG. 2 is a flow chart of an illustrative method that may be performed by and/or using the system of FIG. 1.

FIG. 2 is a flow chart of an illustrative method that may be performed by and/or using the system of FIG. 1. In step 201, a customer (such as Customer A or Customer B) signs into the online banking web site via network 106 that is produced by web server 104. Signing in to the web site may entail providing a correct userid and password, and/or using any other steps for ensuring that the person requesting access is an authorized person.

Once signed in to the online banking web site, the customer may be presented with a number of displayed user-selectable functions. These functions may include, for instance, viewing that customer's account details, applying for additional accounts, changing account properties, and/or a bill pay function. The bill pay function, upon selection by the customer in step 202, may allow the customer to set up payments from one or more of the customer's accounts to one or more payees defined by the customer. The payments may be one-time pre-scheduled or immediate payments, or they may be automatic payments in accordance with a periodic schedule. For instance, Customer A may decide to make a one-time immediate payment from Account A to Payee B, and to set up an automatic monthly payment from Account B to Payee A.

To set these payments up, the following steps may be performed. The online banking web site may present a list of all of the payees associated with Customer A in database 103. If the desired payee is already associated with Customer A in database 103 (and thus displayed by the online banking web site), then the customer may simply select one of the displayed payees. However, if the desired payee is not listed, then Customer A may decide to set up, or add, that payee so as to be associated with Customer A. Customer A may choose to do this by selecting a displayed user-selectable hyperlink (such as a hyperlink labeled "Set Up New Payee") or other displayed element. In response to the user selection, the process moves to step 205.

In step 205, the online banking web site presents a displayed user interface in which the user (in this example, Customer A) may input information about the desired payee, such as payee name, address, telephone number, payee account number, electronic funds transfer information, etc. In step 206, Customer A may further be presented with a displayed user interface of the online banking web site in which the user may select a default account of Customer A to be associated with the desired payee that was set up in step 205. For instance, Customer A may decide that the default account for the desired new payee will be Account C. Alternatively, there may be no default account for each payee. Instead, the default account may be associated only with the customer itself, regardless of the payee. In further embodiments, there may be no default account provided at all.

In step 207, the online banking web site may present a list of all of the accounts of Customer A that are represented in database 103. These accounts may be accounts managed by Bank A 101, and/or of Bank B 112, and/or of any other financial institution. If the desired account is already listed, then the customer may simply select one of the displayed accounts in step 209. However, if the desired account is not listed, then Customer A may decide to set up, or add, that account so as to be associated with Customer A. Customer A may choose to do this by selecting a displayed user-selectable hyperlink (such as a hyperlink labeled "Set Up New Account") or other displayed element. In response to the user selection, the process moves to step 208. In step 208, the online banking web site presents a displayed user interface in which the user (in this example, Customer A) may input information about the desired new account to be added, such as account name, account number, etc.

Finally, in step 210 the actual payment is scheduled. Here, the online banking web site may present a displayed user interface in which the user may enter a monetary amount of the payment, a day or date (and/or time) for the payment to be made, and/or a recurrence frequency of the payment if appropriate (e.g., weekly, monthly, etc.).

Variations on the process of FIG. 2 are possible. For example, opportunities to add new payees and accounts may be presented at different times than as shown in FIG. 2.

Figure 3:
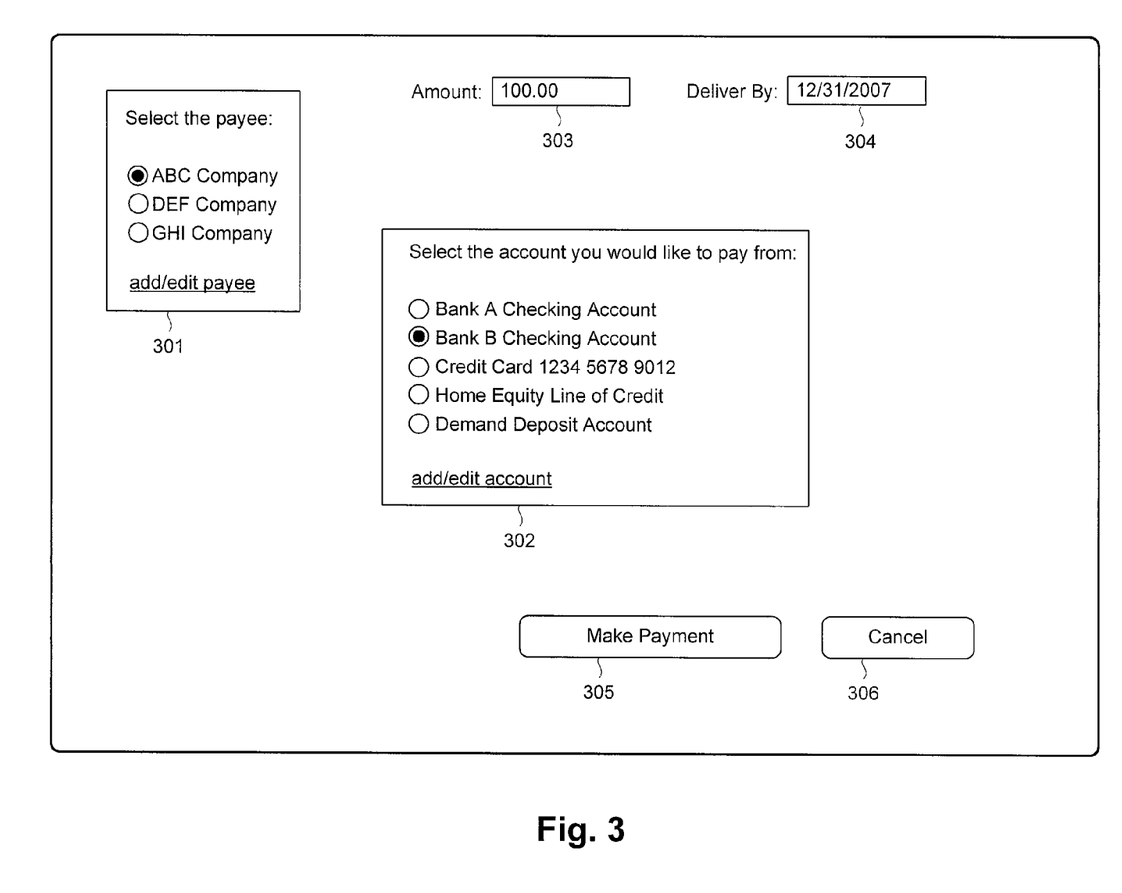
FIG. 3 is an illustrative screen shot of an interactive online banking web site user interface provided to a customer of the system of FIG. 1.

FIG. 3 is an illustrative screen shot of an interactive online banking web site user interface provided to a customer of the system of FIG. 1. In this example, the displayed user interface includes a section 301 for selecting the payee, a section 302 for selecting an account from which payment will be made to the selected payee, a section 303 for selecting or otherwise inputting the amount to be paid, a section 304 for selecting or otherwise inputting the scheduled day, date, and/or time for the payment, a user-selectable "Make Payment" button 305, and a user-selectable "Cancel" button 306.

In the example of FIG. 3, it can be seen that section 301 includes a list of potential payees from which the user may select using displayed user-selectable radio buttons. Likewise, section 302 includes a list of potential accounts from which the user may select using displayed user-selectable radio buttons. However, other user selection mechanisms may be provided, such as by making each listed payee and account a user-selectable hyperlink or the like. Also, in section 301 there is an "add/edit payee" hyperlink, and in section 302 there is an "add/edit account" hyperlink.

As can also be seen in FIG. 3, the payees are different entities: ABC Company, DEF Company, and GHI Company. Thus, the user of the online banking web site may make payments to any payee desired. As further shown, the listed accounts may be a variety of different accounts that may be of different types. For instance, a checking account from Bank A 101 is shown ("Bank A Checking Account"), a checking account from Bank B 112 is shown ("Bank B Checking Account"), a credit card account it shown ("Credit Card 1234 5678 9012"), a home equity line of credit account is shown ("Home Equity Line of Credit"), and a demand deposit account (DDA) is shown ("Demand Deposit Account"). As previously discussed, other account types are possible, such as savings accounts, money market accounts, and other investment accounts.

In this example, the user has selected payee ABC Company to be paid from Bank B Checking Account. The user has further indicated that the payment will be for the amount of $100.00 and shall be paid on Dec. 31, 2007. Once the user has made the appropriate selections and other inputs, the user may choose to either cancel the transaction (using "Cancel" button 306") or submit the transaction (using "Make Payment" button 305).

Responsive to the user selecting "Make Payment" button 305, web server 104 may communicate this selection to account server 102, which in turn may cause network communications server 105 to send and receive the appropriate data over network 106, and/or to send and receive the appropriate data within Bank A, to make the payment happen at the scheduled time. In this example, since the selected account is Bank B Checking Account, network communications server 105 may communicate with Bank B 112 to ensure that Bank B 112 has the appropriate information to allow the payment to be made from Bank B Checking Account.

This process of selecting a payee, an account, a payment amount, and a deliver by date may be repeated for multiple payees and accounts, as desired. Once the user has completed scheduling all desired payments, the user may log out of the online banking web site.

Of course, variations on the user interface shown in FIG. 3 are possible. For example, the various sections may be reconfigured, combined, and/or further split, and/or some of the information may be provided on separate screens.

Payment Migration

Payment migration may be offered anytime a customer who has a checking or other account with Bank A closes either a Bank-A account or a non-Bank-A account with outstanding payments (manual and/or automatic scheduled payments) and/or models set up. The payment migration system may offer the customer the option to migrate all payments and/or models from the account being closed to their checking account at Bank A.

Figure 4:
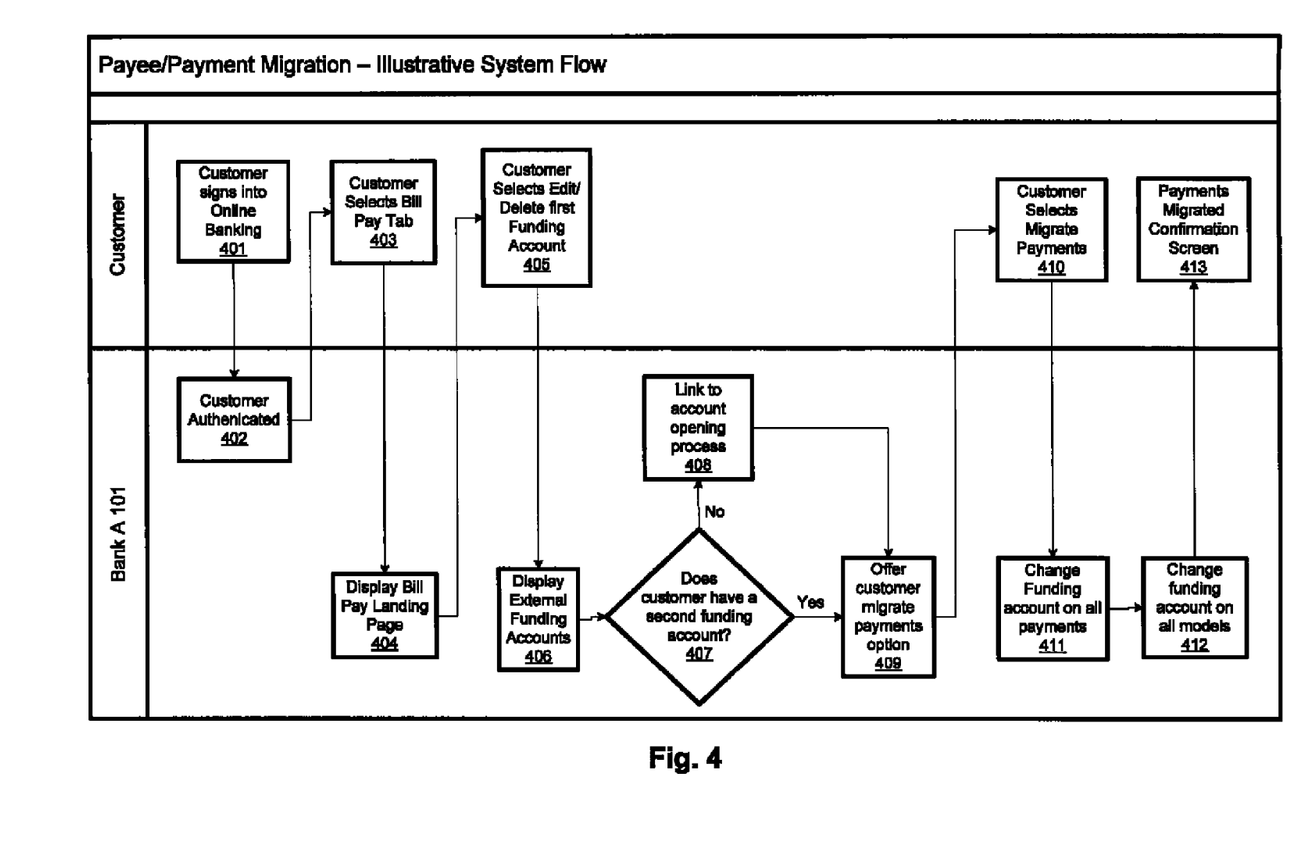
FIG. 4 is a flow chart of an illustrative method that may be performed by and/or using the payment migration system.

FIG. 4 shows an example of how a Bank A customer may sign into the online banking web site (steps 401 and 402), and selects the appropriate functions, such as a Bill Pay Tab (steps 403 and 404), and edit/delete a first funding account (step 405). The first funding account may be an account external or internal to Bank A. In response, the online banking web site displays a list of funding accounts (external and/or internal accounts) available to the customer (step 406). The bank system further determines whether the customer has a Bank A (i.e., internal) account (step 407) to which payment may be migrated from the first account. If not, then the online banking web site offers to help the customer open a new internal account with Bank A, and goes through the account opening process (step 408). In the event that the customer is not presently a Bank A customer, then the customer may have not yet needed to log in and be authenticated in steps 401 and 402.

If the customer has a Bank A account eligible for migration as determined in step 407, then in step 409 this function is offered by the online banking website. If the customer selects this function in step 410, then in steps 411-413, all payments and models are changed (migrated) from the first account to the second account.

Figure 5:
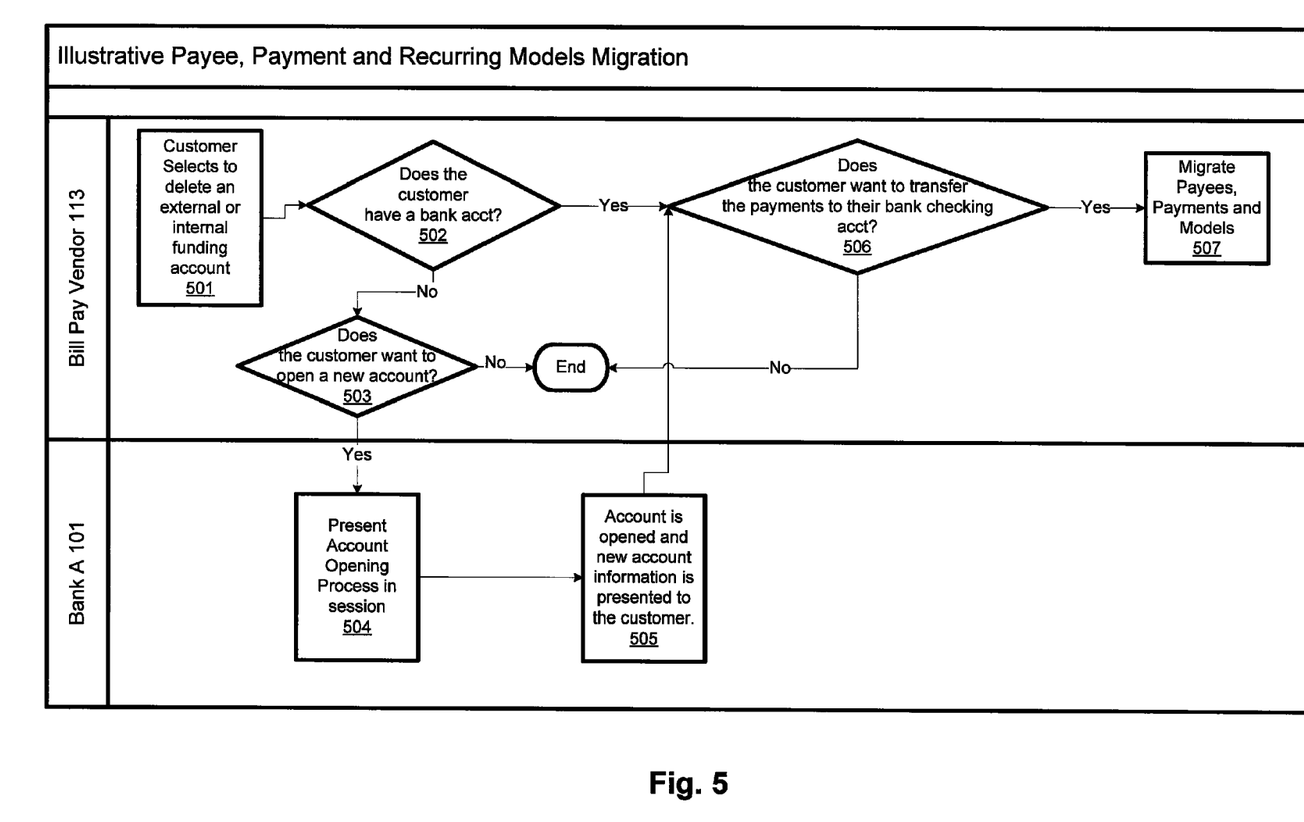
FIG. 5 is a flow chart of an illustrative method that may be performed by and/or using the payment migration system.

FIG. 5 shows another illustrative view of this process. In step 501, the customer selects to delete a first external or internal funding account. In step 502, it is determined whether the customer has a second internal Bank A account. If not, then the customer is offered the opportunity to open such an account through Bank A's online banking website in steps 503-505. Once the customer has the second account, then the customer is presented with the option in step 506 to transfer (migrate) payments and models from the first account to the second account. If the customer selects this option, then in step 507 the migration is performed.

Account Synchronization

In addition to payment migration as discussed above, another service may be offered to Bank A's customers, in which real time interfaces with one or more vendors are provided to capture external pay from and transfer to/from accounts and display them to Bank A's customers in both the bill pay function and the account transfer function using the online banking website.

For example, in a multiple account payment platform such as described above, a customer can perform several different functions. One function available to the customer is that the customer can use the accounts in a multiple account payment platform to directly pay bills. These accounts from which the customer can pay bills are referred to as "pay from" accounts. Another function available to the customer is that the customer can transfer funds between different accounts in a multiple account payment platform. These accounts between which the customer can transfer funds are referred to as "transfer to/from" accounts. It is noted that, as discussed above, accounts in a multiple account payment platform may be accounts managed by different banks (i.e., service providers). Therefore, the "transfer to/from" accounts do not have to be internal accounts of the first bank. Instead, the "transfer to/from" accounts can be accounts that are external to the first bank, but still included in the multiple account payment platform. Hence, in this way, funds can be transferred quickly and easily between "transfer to/from" accounts of the multiple account payment platform even when one of the "transfer to/from" account is external to the first bank.

According to aspects of this disclosure, some user interfaces used with the multiple account payment platform may include header "tabs" which describe functions the customer can perform. For example, an illustrative user interface may include a "Bill Pay" tab or a "Transfer Funds" tab. Upon opening one of these tabs, the list of accounts which may be used for that function will be listed. For example, by opening the "Bill Pay" tab, the list of accounts from which the customer can pay bills (i.e., the "pay from" accounts) are listed. Similarly, by opening the "Transfer Funds" tab, the list of accounts between which the customer can transfer funds (i.e. "transfer to/from" accounts) are listed. It is noted that a particular account can be both a "pay from" account and "transfer to/from" account. In this case, that particular account should be listed under both the "Bill Pay" tab and the "Transfer Funds" tab.

However, currently an account must be registered separately as a "pay from" account and also registered separately as a "transfer to/from" account. In other words, if an account (e.g., a checking account with Bank A) is to be used as both a "pay from" account and also a "transfer to/from" account, then the account information (e.g., routing number, account number, etc.) must be entered twice (once in the "Bill Pay" section and once in "Transfer Funds" section). Having to enter the account information repeatedly can be tedious for the customer. Further, having to enter the account information more than once may also confuse the customer. For example, a customer who has entered the account information a first time, may expect to see the account as an available account under both the "Bill Pay" and "Transfer Funds" tabs, because the customer may assume that now that the bank has the account information, the bank should be able to make the account available for both purposes. Therefore, when the account is only displayed in one tab and not the other, the customer may not understand why they must enter the information again. Additionally, requiring the customer to enter the account information in several times would only increase the likelihood that the customer may enter the account information incorrectly.

One of the reasons that the customer may have to enter the information into the system more then once is that the multiple account payment platform may be associated with separate vendors, such as a bill pay vendor 113 or a transfer vendor 115. In other words, the bank (i.e., service provider) may contract out such bill pay and transfer funds functions of the bank's online banking system to bill pay vendor 113 or a transfer vendor 115. Therefore, when the customer enters the account information into the bank's online bank system (e.g., enrolls a new bill pay or a new transfer funds account) the account information is actually being entered into the bill pay vendor's 113 database or a transfer vendor's 115 database (this may be unbeknownst to the customer who thinks they are simply entering the information into the bank's database). The bill pay vendor 113 and the transfer vendor 115 may be separate companies and, hence, have separate databases which don't communicate with each other. As a result, the account information must be entered separately for each function. In other words, currently, customers must enter their "pay from" account information, go through a validation process, and then repeat the same process if they want to use the same account as a "transfer to/from" (or simply known as a "transfer" account) account. Now, however, a database is provided that pulls the "pay from" and "transfer" accounts that a customer sets up into a single place so that they can use them either place. Thus, the customer may enter the account information only once into either the bill pay function or the transfer funds function, and the account will now be available for both the bill pay and transfer funds functions. This may help reduce or even eliminate duplicate data entry by customers, as well as duplicate account validation processes, thereby potentially saving time and money.

According to aspects of this disclosure, when a customer enrolls a new "pay from" account on the online banking website and completes the processes to validate that account, a bill pay vendor (such as bill pay vendor 113 in FIG. 1) uses a data feed, such as a real time feed, to send the account information to Bank A's database 103 to update the records. Database 103 then verifies that this is an update and, if it is, updates the appropriate record. The account information is then displayed to the customer on the online banking website as a validated account available for bill pay or transfers. Bill pay vendors are entities that work with a bank to provide for electronic payment of bills from a bank customer's account. An example of such a bill pay vendor is CheckFree Corporation.

A similar process also occurs when the customer adds a "transfer to/from" account. In other words, when a customer enrolls a new "transfer to/from" account on the online banking website and completes the processes to validate that account, a transfer vendor (such as transfer vendor 115 in FIG. 1) uses a data feed, such as a real time feed, to send the account information to Bank A's database 103 to update the records. Database 103 then verifies that this is an update and, if it is, updates the appropriate record. The account information is then displayed to the customer on the online banking website as a validated account available for bill pay or transfers. Transfer vendors are entities that work with a bank to provide for electronic transfer of funds from a bank customer's first account to a bank customers second account (the first and second accounts may be managed by two different banks). An example of such a bill pay vendor is Cash Edge Corporation.

Figure 6:
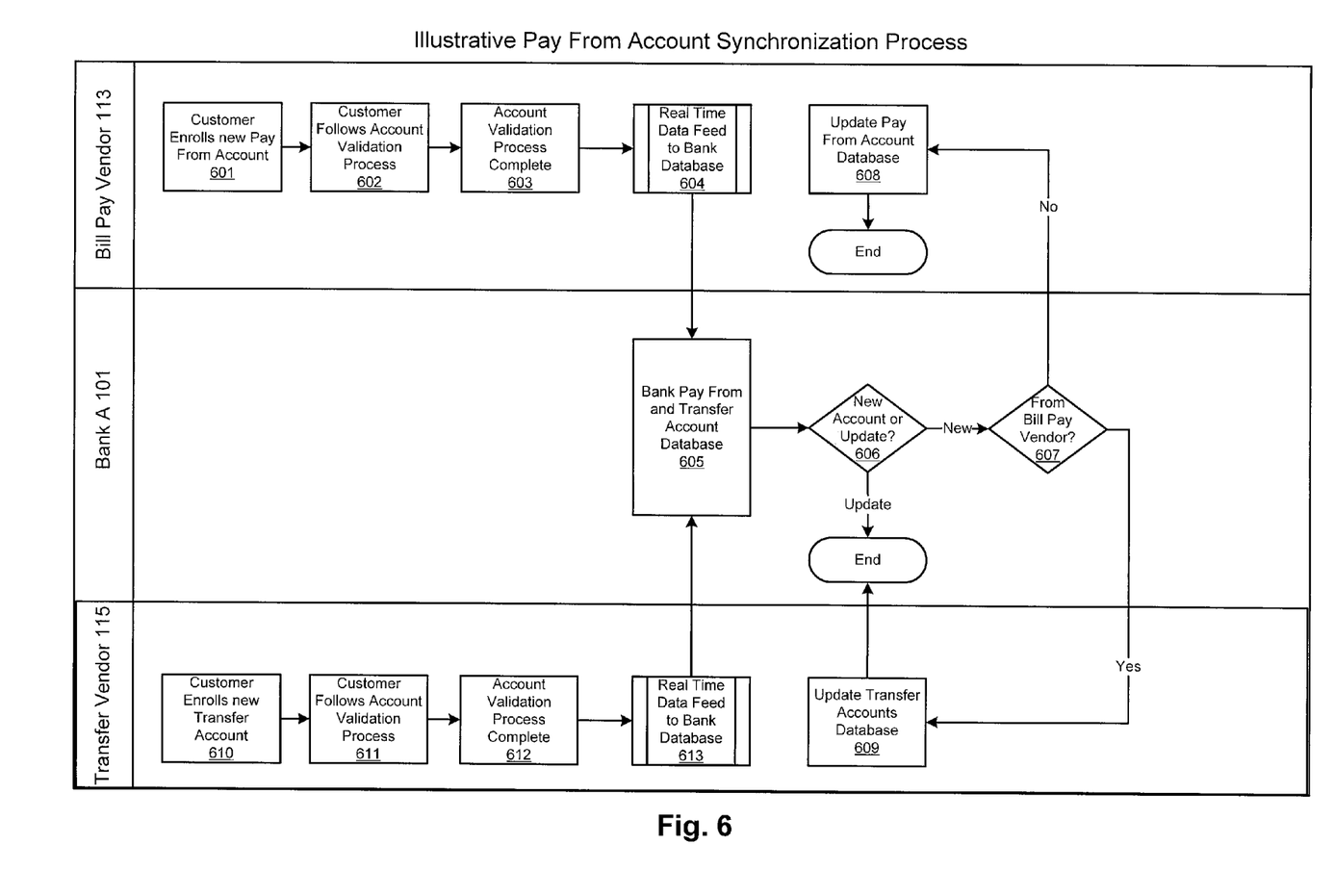
FIG. 6 is a flow chart of an illustrative method that may be performed by and/or using the account synchronization system.

An example of the synchronization process is described with reference to FIG. 6. In this example, there are two possible ways a new account may be opened—from the online banking website of Bank A, or from a separate bill pay vendor (such as on the bill pay vendors' website). In step 601, the customer enters a new pay-from account into the bill pay vendor's website by inputting the account's routing and account numbers. In step 602, the customer performs the appropriate processes to validate the newly added account, and in step 603 the validation is successfully completed. Then, in step 604, the account data is sent (which may be in real time) to the database of Bank A.

In step 605, the received account data is added to an external account database of Bank A. The external account database may be, for instance, part of database 103, or it may be a separate database. In step 606, it is determined whether this is a new account or an update to an existing account. If it is determined to be an update to an existing account, then the process ends. But, if it is determined to be a new account, then in step 607 it is determined whether the new account information was received from the bill pay vendor. In this example, the new account information was from the bill pay vendor (as seen in Step 601) and, therefore, the answer would be "Yes." Hence, the new account information is not sent back to the bill pay vendor to update the pay from accounts database as shown in step 608 (since the bill pay vendor already has the new account information because it was entered through the bill pay vendor), rather the new account information is sent to the transfer vendor to update the transfer accounts database as shown in step 609 (since the transfer vendor does not have the new account information which was entered through the bill pay vendor).

In other words, if the new account information is from the bill pay vendor, then in step 609 the bank A's transfer accounts database is updated, and the process ends. The transfer accounts database may be, for instance, part of database 103, or it may be a separate database. However, alternatively, if the new account information is not from the bill pay vendor (e.g., the new account information is from the transfer vendor 115 as will be discussed in detail below), then in step 607 the new account information is sent to the bill pay vendor, and the bill pay vendor updates its database in step 608.

For example, a new transfer account may be added from the online banking website. For instance, in step 610, a customer may enroll a new transfer account into the transfer vendor's website by such as by inputting the account's routing and account number. In steps 611 and 612, the new transfer account information is validated and approved. Then, in step 613, the new transfer account data is passed, such as in real time, to Bank A's external account database.

In step 605, the received account data is added to an external account database of Bank A. The external account database may be, for instance, part of database 103, or it may be a separate database. In step 606, it is determined whether this is a new account or an update to an existing account. If it is determined to be an update to an existing account, then the process ends. But, if it is determined to be a new account, then in step 607 it is determined whether the new account information was received from the bill pay vendor. In this example, the new account information was not from the bill pay vendor (as seen in Step 610) and, therefore, the answer would be "No." Hence, the new account information is sent to the bill pay vendor to update the pay from accounts database as shown in step 608 (since the bill pay vendor does not have the new account information because it was entered through the transfer vendor).

In other words, if the new account information is from the transfer vendor, then in step 608 the bank A's pay from accounts database is updated, and the process ends. The pay from accounts database may be, for instance, part of database 103, or it may be a separate database.

Hence, it can be seen that above described system and method allow the bank (i.e. service provider) to capture internally, through real time interfaces, "pay from" account information and "transfer to/from" account information from external vendors. In other words, when the customer creates a "pay from" account or a "transfer to/from" account with an external vendor (even if its through the bank's online banking website), that account information will be pulled by into a database which will store and transfer the account information so that such account information can be used in either the Bill Pay and Transfer Funds spaces of the bank's online banking website.

Therefore, the above described system and method allow the bank (i.e., service provider) to display to the customers both the "pay from" accounts and "transfer to/from" accounts in each of the Bill Pay and Transfer Funds spaces in the Online Banking As a result, the customer will only have to enter the account information once (e.g., create a "pay from" account or a "transfer to/from" account) and that account information will be displayed and can be used in either the Bill Pay and Transfer Funds spaces. This is advantageous since it reduced time expended by the customer on duplicative data entry and further eliminates errors that might occur during the multiple data entries. Hence, time and money can be saved.

Thus, systems and methods have been described that provide significant convenience to customers of the bank or other service provider, and may potentially entice customers to consolidate lines of credit and other types of financial accounts with the same bank and/or to explore what other services may be provided by that bank.

What is claimed is:

1. A computer-assisted method, comprising:
electronically receiving data from a bill pay vendor or a transfer vendor regarding the creation a first financial account or an update to the first financial account;
storing the data from the bill pay vendor or the transfer vendor in a database;
determining whether the data from the bill pay vendor or the transfer vendor represents the creation of the first financial account or an update to the first financial account;
when the data from the bill pay vendor or the transfer vendor represents the creation of the first financial account, determining whether the data is received from the bill pay vendor or is received from the transfer vendor and based upon the determination of from where the data is received, electronically transferring the data from the bill pay vendor to the transfer vendor when the data is received from the bill pay vendor, or electronically transferring the data from the transfer vendor to the bill pay vendor when the data is received from the transfer vendor;

retrieving the stored data from the database and causing an indication to be displayed on a computer display through which a user can select the first financial account as an account from which a payment will be made directly to a payee; and retrieving the stored data from the database and causing an indication to be displayed on the computer display through which a user can select the first financial account as an account from which funds will be transferred to or from a second financial account.

2. The computer-assisted method of claim 1, wherein electronically receiving data from a bill pay vendor or the transfer vendor includes receiving a real time data feed from the bill pay vendor or the transfer vendor, further wherein the real time data feed includes data regarding the creation of the first financial account.

3. The computer-assisted method of claim 1, wherein one of the first financial account or the second financial account is an account managed by a first bank and the other of the first financial account or the second financial account is an account managed by a different second bank.

4. The computer-assisted method of claim 1, further comprising causing the selected first financial account to make the payment to the payee.

5. The computer-assisted method of claim 1, further comprising causing the funds to be transferred to or from the selected first financial account to or from the second financial account.

6. A non-transitory computer-readable medium storing computer-executable instructions for performing a method, the method comprising:

electronically receiving data from a bill pay vendor or a transfer vendor regarding the creation a first financial account or an update to the first financial account;

storing the data from the bill pay vendor or the transfer vendor in a database;

determining whether the data from the bill pay vendor or the transfer vendor represents the creation of the first financial account or an update to the first financial account;

when the data from the bill pay vendor or the transfer vendor represents the creation of the first financial account, determining whether the data is received from the bill pay vendor or is received from the transfer vendor and based upon the determination of from where the data is received, electronically transferring the data from the bill pay vendor to the transfer vendor when the data is received from the bill pay vendor, or electronically transferring the data from the transfer vendor to the bill pay vendor when the data is received from the transfer vendor;

retrieving the stored data from the database and causing an indication to be displayed on a computer display through which a user can select the first financial account as an account from which a payment will be made directly to a payee; and retrieving the stored data from the database and causing an indication to be displayed on the computer display through which a user can select the first financial account as an account from which funds will be transferred to or from a second financial account.

7. The computer-readable medium of claim 6, wherein electronically receiving data from the bill pay vendor or the transfer vendor includes receiving a real time data feed from the bill pay vendor or the transfer vendor further wherein the real time data feed includes data regarding the creation of the first financial account.

8. The computer-readable medium of claim 6, wherein one of the first financial account or the second financial account is an account managed by a first bank and the other of the first financial account or the second financial account is an account managed by a different second bank.

9. The computer-readable medium of claim 6, further comprising causing the selected first financial account to make the payment to the payee.

10. The computer-readable medium of claim 6, further comprising causing the funds to be transferred to or from the selected first financial account to or from the second financial account.

11. A system coupled to a bill pay vendor and a transfer vendor via a network, the system comprising:

a service provider computing device which includes at least one database;

wherein the system electronically receives data over the network from the bill pay vendor or the transfer vendor regarding the creation of a first financial account or an update to the first financial account;

further wherein the service provider computing device stores the data from the bill pay vendor or the transfer vendor in the database;

further wherein the service provider computing device determines whether the data from the bill pay vendor or the transfer vendor represents the creation of the first financial account or an update to the first financial account;

further wherein when the data from the bill pay vendor or the transfer vendor represents the creation of the first financial account, the service provider computing device determines whether the data is received from the bill pay vendor or is received from the transfer vendor and based upon the determination of from where the data is received, and electronically transfers over the network the data from the bill pay vendor to the transfer vendor when the data is received from the bill pay vendor, or electronically transfers the data from the transfer vendor to the bill pay vendor when the data is received from the transfer vendor;

further wherein service provider computing device retrieves the stored data from the database and causes an indication to be displayed on a computer display through which a user can select the first financial account as an account from which a payment will be made directly to a payee; and further wherein the service provider computing device retrieves the stored data from the database and causes an indication to be displayed on the computer display through which a user can select the first financial account as an account from which funds will be transferred to or from a second financial account.

12. The system of claim 11, wherein electronically receiving data over the network from includes receiving a real time data feed from the, further wherein the real time data feed includes data regarding the creation of the first financial account.

13. The system of claim 11, wherein one of the first financial account or the second financial account is an account managed by a first bank and the other of the first financial account or the second financial account is an account managed by a different second bank.

14. The system of claim 11, wherein the service provider computing device causes the selected first financial account to make the payment to the payee.

15. The system of claim 11, wherein the service provider computing device causes the funds to be transferred to or from the selected first financial account to or from the second financial account.

* * * * *

UNITED STATES PATENT AND TRADEMARK OFFICE
CERTIFICATE OF CORRECTION

| | | |
|---|---|---|
| PATENT NO. | : 8,001,045 B1 | Page 1 of 1 |
| APPLICATION NO. | : 12/262515 | |
| DATED | : August 16, 2011 | |
| INVENTOR(S) | : Brian J. McClinton | |

It is certified that error appears in the above-identified patent and that said Letters Patent is hereby corrected as shown below:

Column 11, Claim 2, Line 23:
  Please delete "from a the" and insert --from the--

Column 13, Claim 12, Line 2:
  Please delete "from"

Column 13, Claim 12, Line 3:
  Please delete "from the"

Signed and Sealed this
Twenty-sixth Day of June, 2012

David J. Kappos
*Director of the United States Patent and Trademark Office*